US009591604B2

(12) United States Patent
Venkatraman et al.

(10) Patent No.: US 9,591,604 B2
(45) Date of Patent: Mar. 7, 2017

(54) SYSTEM, METHOD AND/OR DEVICES FOR SELECTING A LOCATION CONTEXT IDENTIFIER FOR POSITIONING A MOBILE DEVICE

(71) Applicant: QUALCOMM Incorporated, San Diego, CA (US)

(72) Inventors: Sai Pradeep Venkatraman, Santa Clara, CA (US); Gengsheng Zhang, Cupertino, CA (US); Marlene Wan, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 112 days.

(21) Appl. No.: 14/194,530

(22) Filed: Feb. 28, 2014

(65) Prior Publication Data

US 2014/0323163 A1   Oct. 30, 2014

Related U.S. Application Data

(60) Provisional application No. 61/816,670, filed on Apr. 26, 2013.

(51) Int. Cl.
| | |
|---|---|
| *H04W 24/00* | (2009.01) |
| *H04M 3/42* | (2006.01) |
| *H04W 64/00* | (2009.01) |
| *G01S 5/02* | (2010.01) |
| *H04W 4/04* | (2009.01) |

(52) U.S. Cl.
CPC .......... *H04W 64/00* (2013.01); *G01S 5/0236* (2013.01); *G01S 5/0252* (2013.01); *H04W 4/043* (2013.01)

(58) Field of Classification Search
CPC ........ H04W 64/00; H04W 4/02; H04W 4/028
USPC ............ 455/404.2, 414.1–414.2, 456.1–457
See application file for complete search history.

(56) References Cited

U.S. PATENT DOCUMENTS

| | | | |
|---|---|---|---|
| 8,073,795 B2 | 12/2011 | Honisch | |
| 8,370,062 B1 * | 2/2013 | Starenky | ............... H04W 4/025 340/3.3 |
| 8,437,775 B2 | 5/2013 | Lindoff et al. | |
| 2009/0219209 A1 | 9/2009 | Bush et al. | |
| 2011/0081919 A1 | 4/2011 | Das et al. | |
| 2011/0289064 A1 * | 11/2011 | Lebeau | ............... G06F 17/3087 707/706 |

(Continued)

FOREIGN PATENT DOCUMENTS

| | | |
|---|---|---|
| CN | 102665170 A | 9/2012 |
| EP | 2393328 A1 | 12/2011 |

(Continued)

OTHER PUBLICATIONS

International Search Report and Written Opinion—PCT/US2014/035372—ISA/EPO—Jan. 12, 2015.

*Primary Examiner* — Dung Hong
(74) *Attorney, Agent, or Firm* — Berkeley Law & Technology Group, LLP

(57) ABSTRACT

Disclosed are systems, methods and devices for providing positioning assistance data to a mobile device based, at least in part, on a location context identifier (LCI). In one particular implementation, a user may select from a one or more of candidate LCIs identified, for example, based on acquiring one or more signals from transmitters in range of the mobile device.

30 Claims, 7 Drawing Sheets

(56) References Cited

U.S. PATENT DOCUMENTS

2012/0028649 A1* 2/2012 Gupta .................. G01S 5/0236
 455/456.1
2012/0122487 A1 5/2012 Holm et al.
2014/0081572 A1* 3/2014 Poornachandran ..... H04W 4/02
 701/537
2014/0114567 A1* 4/2014 Buchanan ............... G01S 19/45
 701/454

FOREIGN PATENT DOCUMENTS

SG  WO 2013/070170 A1 * 5/2013  ............. H04W 4/02
WO  WO-2013049703 A2  4/2013

\* cited by examiner

SYSTEM, METHOD AND/OR DEVICES FOR SELECTING A LOCATION CONTEXT IDENTIFIER FOR POSITIONING A MOBILE DEVICE

CLAIM OF PRIORITY

This application claims the benefit of and priority, under 35 USC §119 to U.S. Provisional Application Ser. No. 61/816,670, filed Apr. 26, 2013, and entitled, "SYSTEM, METHOD AND/OR DEVICES FOR SELECTING A CONTEXT INDICATOR FOR POSITIONING," which is assigned to the assignee hereof and which is incorporated herein by reference.

BACKGROUND

1. Field

The subject matter disclosed herein relates to mobile electronic devices, and, more particularly, to methods, apparatuses, and articles of manufacture that may be used to select a location context identifier to assist with presenting indoor maps on a mobile electronic device.

2. Information

GPS and other like satellite positioning systems (SPSs) have enabled navigation services for mobile handsets in outdoor environments. However, since satellite signals may not be reliably received and/or acquired in an indoor environment, different techniques may be employed to enable indoor navigation services. For example, a mobile device may typically obtain a position fix by measuring ranges to three or more terrestrial wireless access points that may be positioned at known locations. Such ranges may be measured, for example, by obtaining a media access control identification (MAC ID) address from signals received from such access points and measuring one or more characteristics of signals received from such access points such as, for example, signal strength, round trip delay, just to name a few examples.

In some implementations, an indoor navigation system may provide a digital electronic map to a mobile device as the device enters an indoor area. Such a map may present indoor features such as doors, hallways, entryways, walls, etc. A digital electronic map of an indoor area may also show points of interest (POIs) such as restaurants, café s, stores, kiosks, restrooms, etc. Such a digital electronic map may be stored at a server to be accessible by a mobile device through selection of a universal resource locator (URL), for example. By obtaining and presenting such a map, a mobile device user may be apprised of his or her current location on a display device that provides the user with additional context.

However, there are occasions in which ascertaining an accurate position estimate of a mobile device within a multistoried indoor structure, such as a large airport or a shopping mall, for example, may be problematic. In such instances, characteristics of signals received from various access points located within the structure may not vary to a degree sufficient to enable a mobile device to accurately locate itself on a particular floor or inside a particular area. For example, in a large shopping mall, received signal strength, round trip delays, and other characteristics of signals received by a mobile device at or near a ground floor may be indistinguishable from signal characteristics received by mobile device at or near a second floor. In such instances, a location server, for example, may be unable to accurately estimate position of a mobile device based on signals received at the mobile device. Hence, ascertaining and providing the correct digital map, which may be used by a mobile device user to navigate to points of interest, such as on a particular floor of a shopping mall, may be especially difficult relative to other digital maps at adjacent areas or at other areas with similar signal characteristics.

SUMMARY

Briefly, particular implementations may be directed to a method comprising, at a mobile device, identifying a plurality of candidate location context identifiers (LCIs) and ranking at least two of the plurality of candidate LCIs. The ranked at least two candidate LCIs including at least a top ranked candidate LCI having a first probability or likelihood that the mobile device is located within an area referenced by the top ranked candidate LCI and another ranked candidate LCI having a second probability or likelihood that the mobile device is located within an area referenced by the another ranked candidate LCI. The method may additionally comprise presenting the top ranked candidate LCI and presenting the another ranked candidate LCI if a difference between the first probability or likelihood and the second probability or likelihood is less than a threshold amount. The method may further comprise receiving a selection of the presented top ranked candidate LCI or the presented another ranked candidate LCI and receiving positioning assistance data over a wireless communications channel based, at least in part, on the selection.

Another particular implementation may be directed to a mobile device comprising a display device, a transceiver to receive and transmit wireless signals, and one or more processors to identify a plurality of candidate location context identifiers (LCIs) based, at least in part, on the wireless signals received by the transceiver. The one or more processors may additionally rank at least two of the plurality of candidate LCIs, the ranked at least two candidate LCIs including at least a top ranked candidate LCI having a first probability or likelihood that the mobile device is located within an area referenced by the top ranked candidate LCI and another ranked candidate LCI having a second probability or likelihood that the mobile device is located within an area referenced by the another ranked candidate LCI. The one or more processors may additionally initiate presentation of the top ranked candidate LCI on the display device and may initiate presentation of the another ranked candidate LCI, on the display device, if a difference between the first probability or likelihood and the second probability or likelihood is less than a threshold amount. The one or more processors may additionally initiate reception, via a user interface, of a selection of the presented top ranked candidate LCI or the presented another ranked candidate LCI and may initiate reception, via the transceiver, of positioning assistance data based, at least in part, on the selection.

Another particular implementation may be directed to an article comprising a non-transitory storage medium comprising machine-readable instructions stored thereon, which are executable by a special-purpose computing apparatus of a mobile device to identify a plurality of candidate location context identifiers (LCIs) and to rank at least two of the plurality of candidate LCIs, the ranked at least two of candidate LCIs including at least a top ranked candidate LCI having a first probability or likelihood that the mobile device is located within an area referenced by the top ranked candidate LCI and another ranked candidate LCI having a second probability or likelihood that the mobile device is located within an area referenced by the another ranked candidate LCI. The machine-readable instructions may be additionally to present, on a display device, the top ranked candidate LCI and to present, on a display device, the another ranked candidate LCI if a difference between the first probability or likelihood and the second probability or likelihood is less than a threshold amount. The machine-readable instructions may be additionally to receive a selection of the presented top ranked candidate LCI or the presented another ranked candidate LCI and to receive positioning assistance data over a wireless communications channel based, at least in part, on the selection.

Another particular implementation may be directed to an apparatus comprising means for receiving wireless signals, means for identifying a plurality of candidate location context identifiers (LCIs), means for ranking at least two of the plurality of candidate LCIs, wherein the ranked at least two of the candidate LCIs includes at least a top ranked candidate LCI having a first probability or likelihood that a mobile device is located within an area referenced by the top ranked candidate LCI and includes another ranked candidate LCI having a second probability or likelihood that the mobile device is located within an area referenced by the another ranked candidate LCI. The apparatus may further comprise means for presenting the top ranked candidate LCI, means for presenting the another ranked candidate LCI if a difference between the first probability or likelihood and the second probability or likelihood is less than a threshold amount, means for receiving a selection of the presented top ranked candidate LCI or the presented another ranked candidate LCI, and means for receiving positioning assistance data over a wireless communications channel based, at least in part, on the selection.

It should be understood that the aforementioned implementations are merely example implementations, and that claimed subject matter is not necessarily limited to any particular aspect of these example implementations.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
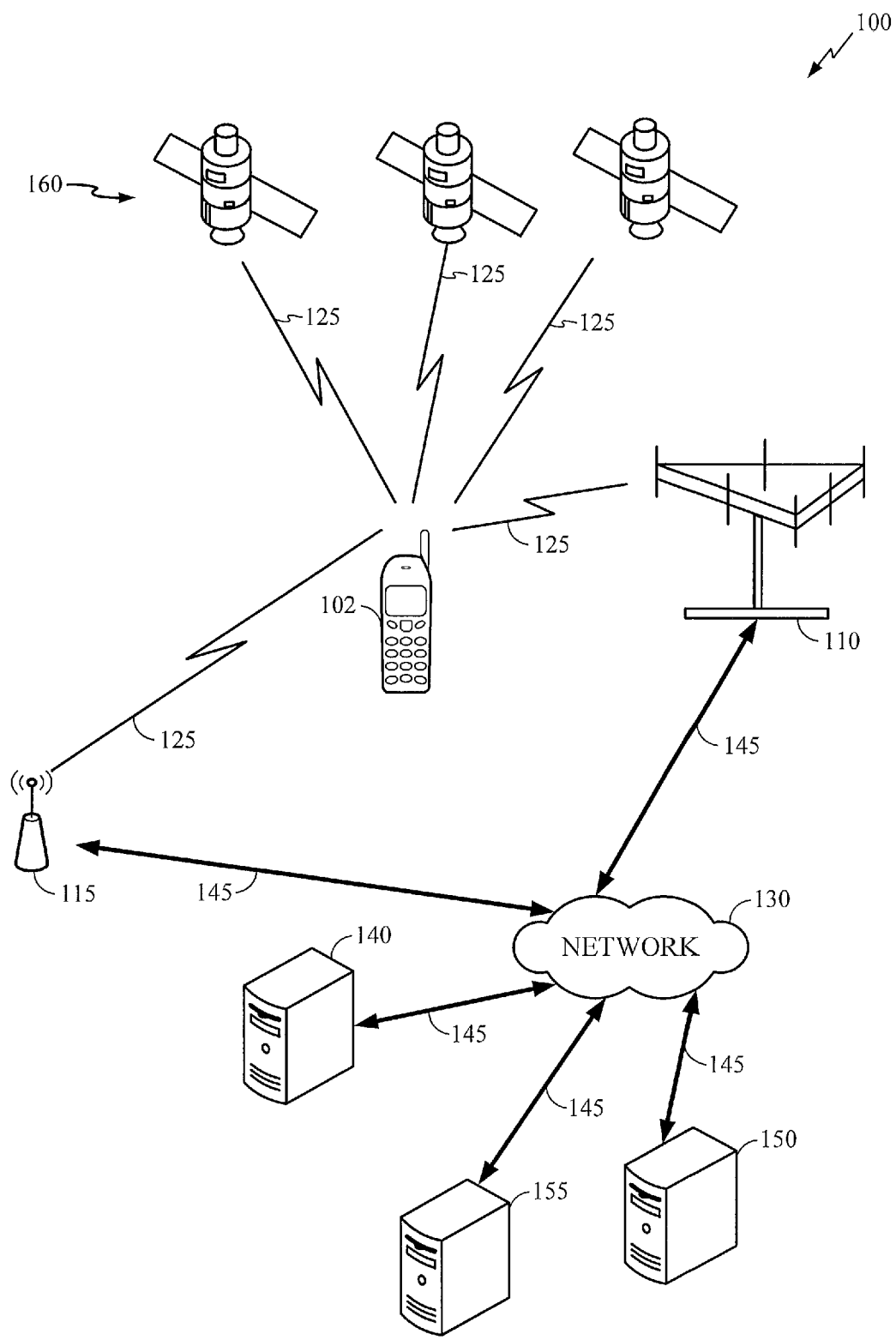
FIG. 1 is a schematic diagram of a network topology according to an embodiment.

In the following detailed description, numerous specific details are set forth to provide a thorough understanding of claimed subject matter. However, those skilled in the art will understand that claimed subject matter may be practiced without these specific details. In other instances, methods, apparatuses, and/or systems that would be known by one of ordinary skill have not been described in detail so as not to obscure claimed subject matter.

As used herein, "mobile electronic device," "mobile device," "wireless device," or the plural form of such terms may be used interchangeably and may refer to any kind of special purpose computing platform or apparatus that may from time to time occupy a position that changes. In some instances, a mobile communication device, for example, may be capable of communicating with other devices, mobile or otherwise, through wireless transmission or receipt of information according to one or more communication protocols. As a way of illustration, special purpose mobile communication devices, which may herein be referred to simply as "mobile devices," may include, for example, cellular telephones, smart telephones, personal digital assistants, laptop computers, personal entertainment systems, tablet personal computers, personal audio or video devices, personal navigation devices, or the like. It should be appreciated, however, that these are merely examples of mobile devices that may be used, at least in part, to implement one or more operations and/or techniques for displaying digital maps, such as digital maps of an indoor area, on a mobile device, for example, and that claimed subject matter is not limited in this respect. It should also be noted that the terms "position" and "location" may be used interchangeably herein.

As used herein, the term "point of interest" or "POI" may refer to a specific useful or interesting point location on a digital map or other type of diagrammatic representation of an area showing physical features. Thus, in a shopping mall, for example, POIs may include bathrooms, conference and/or meeting rooms, department stores, boutiques, kiosks, elevators, escalators, staircases, restaurants, or the like, which may be overlaid on a digital map of a shopping mall, stadium, town square, amphitheater, parking garage, amusement park, or other area. An electronic digital map may, for example, be stored at a suitable server and may be wirelessly accessible by a mobile device, such as via a selection of a Uniform Resource Locator (URL), for example. By obtaining a digital map of an indoor or like area of interest, a mobile device may, for example, be capable of overlaying its current location on the displayed map of the area so as to provide a user with additional context, frame of reference, or the like.

Also as used herein, the term "location context identifier" or "LCI" may represent at least a portion of a complex structure, such as a shopping mall, an airport, stadium, or other complex structure, that may not be mapped according to a global coordinate system. In such a complex structure, for example, the identifier "ground floor" may correspond to a first location context, and the identifier "second-floor" may correspond to a second location context. In another example, such as an airport terminal in which a ground floor may be dedicated to arriving flights and a second (upper) floor may be dedicated to departing flights, a first LCI may be used to provide assistance, such as a digital map that presents points of interest on the ground floor. A second LCI may be used to provide assistance for points of interest on the second floor. Additional LCIs may be used to provide assistance for points of interest on additional floors, such as, for example, a baggage claim and ground transportation floor, a floor dedicated to a first or business class lounge, for example, and so forth. Further, in embodiments, an LCI may be used to provide assistance in navigating to points of interest within a portion of a floor, such as a first LCI for the baggage claim area of an airport's lower floor, a second LCI for ground transportation area of the airport's lower floor, and so forth. Claimed subject matter is intended to embrace all uses of location context identifiers to provide positioning and routing assistance for entire floors of a multilevel structure and/or portions of one or more floors of a multilevel structure depending upon specific geometry and/or complexity.

At times, a mobile device user may be interested in locating, for example, a particular type of POI within, for example, a large shopping mall, an airport, or other complex structure. Within a complex structure, a mobile device may be capable of communicating with wireless access points dispersed at various locations within the structure. Thus, as previously mentioned, a mobile device may evaluate characteristics of signals received from one or more access points located throughout the structure. A mobile device may measure, for example, signal parameters such as round-trip delay, received signal strength, and/or other characteristics in a manner that enables a mobile device to estimate its location relative to one or more access points. An estimated location of a user within an LCI may be indicated at a location on a digital map transmitted to a mobile device by way of a wireless communications channel. A routing application operating on the mobile device may depict a user within an LCI and may present one or more routes to the mobile device user. Responsive to locating a user within an LCI, the mobile device may provide the user with routing commands to direct the user to one or more destination POIs, for example.

However, in some instances, use of signal strength, round trip delay, and other signal characteristics to accurately estimate a location of a mobile device within an LCI may be problematic. For example, in a large, multilevel shopping mall, wireless access points may be positioned in an atrium, for example, in a manner that provides relatively uniform signal strength to two or more floors of the shopping mall. In this instance, for example, a mobile device located on the ground floor may measure a first signal strength of one or more signals from a wireless access point. A second measured signal strength, which may be measured by a mobile device at a second floor of a shopping mall may not be significantly different from a signal strength measured on the ground floor of the shopping mall. Accordingly, a map server may be unable to determine if a user should receive a digital map for the ground floor, for example, or if the user should receive a digital map of the second-floor, basement, mezzanine, or other floor. In these instances, a user may be unable to download an appropriate digital map and may not be able to make use of a mobile device to provide assistance in navigating to a destination POI. In other instances, a user may receive an incorrect digital map from a map server, which may provide routing instructions that are, for example, not suitable for use at the user's current location. In such instances, a user may find themselves wandering about a portion of a shopping mall, for example, attempting to reconcile routing instructions with physical features that appear completely out of place.

In another instance, one or more position estimation approaches may be used in a manner that may provide complementary position information. For example, a mobile device may employ a round trip delay approach which may, for example, provide a first estimate of location within an LCI. However, if a mobile device attempts to make use of complementary position information using, for example, one or more indications of received signal strength of a signal from access points, obstructions such as walls, doors, elevator shafts, and so forth may give rise to considerable signal attenuation. Accordingly, a mobile device may compute conflicting position estimates. In such instances, inaccuracies in position estimations may give rise to a map server, for example, providing an incorrect digital map to a mobile device. Thus, a user may become confused and/or disoriented while attempting to reconcile surroundings with points of interest located on a digital map for example.

In other instances, a map server may download, for example, a digital map of an entire complex structure, such as a shopping mall, amphitheater, stadium, airport terminal, or the like, in the event that an accurate estimate of a mobile device is not possible. In such instances, a map server may be significantly and unnecessarily burdened with frequent requests to download a digital map of an entire venue to mobile device users who may be interested in only a small portion of the venue. Such frequent downloads may also consume wireless channel bandwidth, which may, for example, contribute to the wireless network appearing slow and unresponsive.

In embodiments, an LCI may be used to enable a map server, for example, to provide positioning and/or routing assistance, such as digital maps, planned routes, heatmaps, and so forth, in a manner that avoids transmission of a much larger digital map that may correspond to an entire complex structure, for example. Additionally, embodiments may permit a mobile device user to select an LCI that may increase likelihood that positioning and/or routing assistance, such as digital maps, planned routes, etc., are beneficial and/or advantageous to the user. In embodiments, a small amount of interaction from a mobile device user may bring about, for example, significant increases in accuracy and usability of positioning and/or routing assistance provided by one or more map servers. Such interaction may comprise, for example, selecting an indication of an LCI from a group of indications of LCIs presented by way of a display device. It should be noted, however, that claimed subject matter is not so limited, as LCIs may be selected in accordance with other techniques and/or approaches.

In embodiments, a user may be presented with indications, such as one or more candidate LCIs, by way of a display device of a mobile device. The user may select a desired LCI and, responsive to the selection, may receive positioning and/or routing assistance from a map server, for example. In implementations, if a user selects an LCI, which may correspond to a particular floor of a multilevel structure, a portion of an airport terminal, or other large and at least partially indoor complex structure, a position estimation application may verify or confirm the correct selection. Such confirmation/verification of a user's selection may involve a mobile device measuring signal strength of signals transmitted from nearby wireless access points, determining that a mobile device's estimated position corresponds to a possible position as depicted on a digital map, as will be described further with reference to FIG. 5. In other embodiments, a mobile device may employ one or more sensors, such as a barometric pressure sensor, a vertical acceleration sensor, a magnetometer, or the like, to enable characterizing movement, for example, in a vertical direction. Such measurements may confirm, for example, that a mobile device user is located at a certain elevation (e.g., the 25th floor) above a ground floor of a multistory structure.

In embodiments, a mobile device may automatically select from among LCIs according to a maximum likelihood algorithm or other technique. However, a user may ascertain, either by visual observation, prior knowledge, or by some other means, that the automatic selection of an LCI represents, in fact, an incorrect selection. In such instances, a user may, for example, select to override automatic selection of an LCI. In another instance, for example, a mobile device user may observe that a display device presents indications of LCIs, which may be known, at least by the user, to be incorrect. This may represent an additional instance in which, for example, a user may override a list of displayed LCIs.

In another instance, a user may override an automatically selected LCI if a mobile device fails to compute a position fix based on assistance data obtained from an automatically selected LCI, for example. As will be seen further herein, a user may override a selection of an LCI and/or perform manual selection of an LCI at least partially in response to other occurrences, and claimed subject matter is not limited in this respect.

FIG. 1 is a schematic diagram of a network topology 100 according to an embodiment. As described below, one or more processes or operations for selecting an LCI for positioning a mobile device on a digital map may be implemented in a signal environment that may be utilized by a mobile device 102, for example. It should be appreciated that network topology 100 is described herein as a non-limiting example that may be implemented, in whole or in part, in the framework of various communications networks or combination of networks, such as public networks (e.g., the Internet, the World Wide Web), private networks (e.g., intranets), wireless local area networks (WLAN, etc.), or the like. It should also be noted that claimed subject matter is not limited to indoor implementations. For example, at times, one or more operations or techniques described herein may be performed, at least in part, in an indoor-like environment, which may include partially or substantially enclosed areas, such as airport terminals, multilevel shopping malls, amphitheaters, parking garages, rooftop gardens, patios, or the like. At times, one or more operations or techniques described herein may be performed, at least in part, in an outdoor environment.

As illustrated, network topology 100 may comprise, for example, one or more space vehicles 160, base transceiver station 110, wireless transmitter 115, etc. capable of communicating with mobile device 102 via wireless communication links 125 in accordance with one or more protocols. Space vehicles 160 may be associated with one or more satellite positioning systems (SPS), such as, for example, the United States Global Positioning System (GPS), the Russian GLONASS system, the European Galileo system, as well as any system that may utilize space vehicles from a combination of SPSs, or any SPS developed in the future. Space vehicles 160 may also represent one or more orbiting space vehicles of a regional satellite navigation system such as, for example, Quasi-Zenith Satellite System (QZSS) over Japan, Indian Regional Navigational Satellite System (IRNSS) over India, Beidou/Compass over China, etc., and/or various augmentation systems (e.g., an Satellite Based Augmentation System (SBAS)) that may be associated with or otherwise enabled for use with one or more global and/or regional navigation satellite systems. It should be noted that claimed subject matter is not limited to the use of space vehicles such as those space vehicles of the aforementioned global or regional satellite navigation systems. Base transceiver station 110, wireless transmitter 115, etc. may be of the same or similar type, for example, or may represent different types of devices, such as access points, radio beacons, cellular base stations, femtocells, or the like, depending on an implementation. At times, one or more wireless transmitters, such as wireless transmitters 115, for example, may be capable of transmitting as well as receiving wireless signals.

In some instances, one or more base transceiver stations 110, wireless transmitters 115, etc. may, for example, be operatively coupled to a network 130 that may comprise one or more wired or wireless communications or computing networks capable of transmitting messages including items, such as an electronic digital map, via one or more wireless communication links 125, 145, and so forth. As discussed below, items transmitted in messages may include, for example, an electronic digital map (e.g., floor plans, etc.) depicting features of an indoor or like area of interest (e.g., a shopping mall, retailer outlet, etc.) that may be provided to a mobile device by a transmitter, such as one or more of servers 140, 150, and 155, at or upon entering the area. In particular implementations, an electronic digital map may be divided among LCIs that provide navigation assistance in an indoor area of interest, for example. For example, LCIs for providing positioning assistance within a shopping mall may be divided into one or more LCIs covering a ground floor, a first floor, a second floor, and so forth. Within a ground floor, for example, one or more LCIs may pertain to a food court, ground level parking structure, and/or a ground floor of a major department store, just to name a few examples, and claimed subject matter is not limited in this respect.

Even though a certain number of computing platforms or devices are illustrated herein, any number of suitable computing platforms or devices may be implemented to facilitate or otherwise support one or more techniques or processes associated with network topology 100. For example, at times, network 130 may be coupled to one or more wired or wireless communications networks (e.g., Wi-Fi, etc.) so as to enhance a predominantly indoor coverage area for communications with mobile device 102, one or more base transceiver stations 110, wireless transmitters 115, servers 140, 150, 155, or the like. In some instances, network 130 may facilitate or support femtocell-based operative regions of coverage, for example. Again, these are merely example implementations, and claimed subject matter is not limited in this regard.

Figure 2:
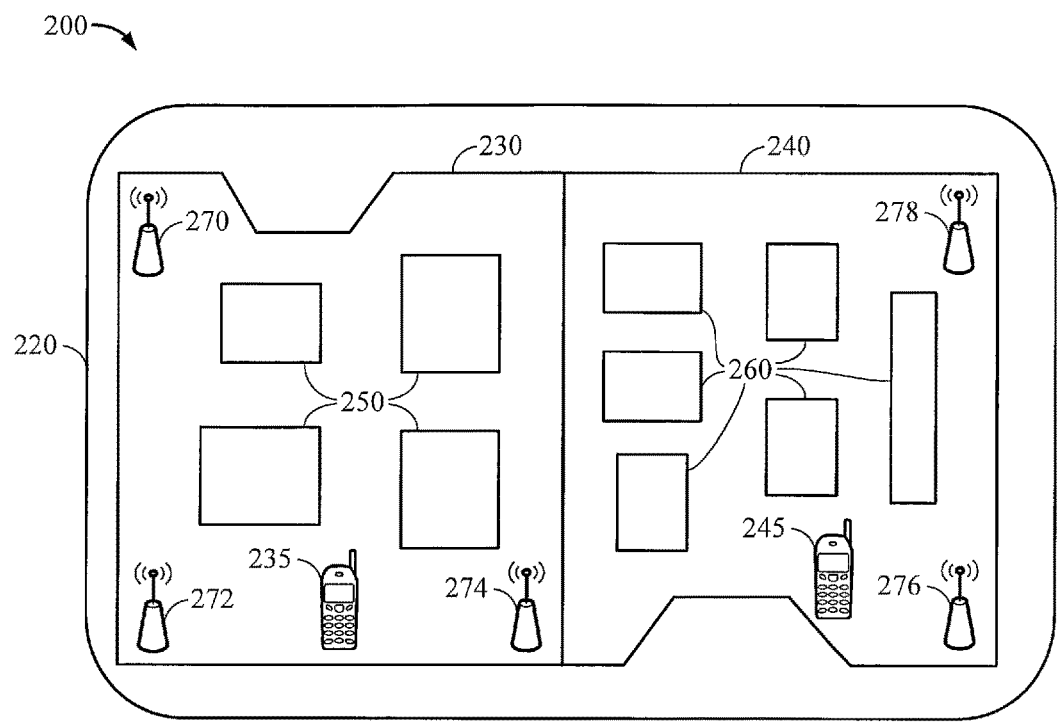
FIGS. 2-3 are diagrams of display on an exemplary mobile device showing images of at least a portion of an indoor environment according to one or more embodiments.

FIG. 2 is a diagram 200 of a display on an exemplary mobile device showing an image of at least a portion of an indoor environment in which a method for selecting an LCI for positioning a mobile device may be employed. In implementations, generating images on display device 220 of FIG. 2 may be in response to a map server, such as one or more of servers 140, 150, and 155, transmitting a digital map to mobile device 102, for example, by way of wireless network 130 and wireless transmitter 115 of FIG. 1. Responsive to such transmission, mobile device 102 may generate a digital map using display device 220. It should be pointed out, however, that display device 220 may generate a digital map by way of a wide variety of other means, and claimed subject matter is not limited in this regard.

Display device 220 of FIG. 2 may present an image of a digital map that represents at least a portion of an indoor shopping mall comprising a variety of features, such as POIs, as well as walls and other obstructions that define an internal layout of the shopping mall. In the embodiment of FIG. 2, ground floor LCI 230 and ground floor LCI 240 may be used to designate separate areas in which assistance data, such as digital maps, may be provided by way of a map server, for example. Thus, a mobile device located near one or more of features 250 may receive positioning assistance, which may comprise a digital map for an LCI that refers to approximately one-half of a ground floor of a shopping mall, for example. In the event that the user approaches features

260, a map server may provide assistance data, such as one or more digital maps, for an LCI that refers to a second half of the ground floor of the shopping mall, for example. It should be noted that for the example of FIG. 2, although only two LCIs are illustrated, embodiments may make use of a smaller number of LCIs, such as one, as well as a larger number of LCIs such as 5, 10, 20, or more, and claimed subject matter is not limited in this respect.

In embodiments, mobile device 235 may estimate its location, for example, within ground floor LCI 230. A position estimation application executing on mobile device 235 may make use of one or more approaches previously described herein, such as estimating round trip delay from one or more wireless access points, correlation of round-trip delay measurements with heat map signatures, and so forth. Accordingly, in the example of FIG. 2, mobile device 235 may estimate round trip delay of signals transmitted between the mobile device and wireless access points 272 and 274 as being at least approximately equal to one another. Mobile device 235 may also estimate round trip delay of signals transmitted between a mobile device and wireless access point 270, located in the upper left corner of the ground floor LCI 230 as being considerably larger than a round trip delay of a signal transmitted between mobile device 235 and wireless access point 272, for example. If a position of mobile device 235 is estimated to lie within ground floor LCI 230, a map server, for example, may transmit positioning assistance, such as a digital map showing features 250 of LCI 230.

Likewise, mobile device 245 may estimate its location by estimating round trip delay of signals transmitted between the mobile device and one or more of wireless access point 276, wireless access point 278, and wireless access point 274. If a position of mobile device 245 is estimated to lie within ground floor LCI 240, a map server, for example, may transmit positioning assistance such as a digital map showing features 260 of LCI 230. It should be noted, however, that mobile devices 235 and 245 may estimate locations by way of techniques other than estimating round trip signal delays, heat map signatures etc., and claimed subject matter is not limited in this respect. Further, mobile devices 235 and 245 may receive positioning assistance by way of receiving digital maps transmitted by way of one or more map servers, and claimed subject matter is not limited in this respect.

It may be appreciated that signals from, for example, wireless access points 270, 272, 274, 276, and 278 may be subject to a wide variety of phenomena that may distort, attenuate, or otherwise alter a signal prior to its acquisition by one or more of mobile devices 235 and/or 245. For example, depending on the precise positioning of mobile device 235, signals from wireless access point 272 may be reflected by one or more of features 250. In some instances, such reflection may give rise to constructive interference at mobile device 235. In other instances, such reflection may give rise to destructive interference at mobile device 235. Accordingly, signals received by mobile device 235 may vary by several decibels as direct and reflected signals transmitted from wireless access point 272 constructively and destructively interfere with one another, for example. Further, reflected signals may exhibit increased round-trip delay, which may at least partially result from increases in path length between line-of-sight and reflected signals from a wireless access points.

In some instances, antennas of the mobile device exhibiting non-omnidirectional coverage may import variations in signal strength received at mobile device 235. For example, a mobile device may comprise one or more antennas positioned to one side of a cover that houses various conductive and dielectric structures (e.g., batteries, display electronics, circuit boards, and other materials) that comprise the mobile device. In such an embodiment, a mobile device antenna may exhibit decreased gain in certain directions brought about by a presence of nearby conductive and dielectric structures. In other directions, a mobile device antenna may exhibit increased gain due to an absence of interfering metallic structures.

In still other instances, variations in signal strength received at mobile device 235 may at least partially result from environmental contributors. Such variations may complicate accurate estimation of position of a mobile device in response to measurement of signal strength from, for example, one or more wireless access points. For example, during a slow shopping season, in which a shopping mall may be relatively deserted, signals transmitted from wireless access points 270, 272, and 274 may undergo only marginal attenuation as signals propagate between wireless access points, through relatively unoccupied free space, before being received at one or more mobile device antennas. In contrast, during a popular shopping season, in which a shopping mall may be crowded with shoppers, signals transmitted from wireless access points 270, 272, and/or 274 may undergo significant attenuation as signals propagate from wireless access points, through masses of shoppers, before being received by one or more mobile device antennas.

Thus, for various reasons, mobile devices 235 and/or 245 may receive signals that vary widely in amplitude (i.e., signal strength) from wireless access points. Accordingly, in some instances, position estimation of mobile devices 235 and 245 using received signal strength may be especially problematic. Errors and round trip delay and/or received signal strength may increase uncertainty in a position estimation of one or more of mobile devices 235 and 245. In such instances, a mobile device may estimate its position as being a considerable distance from its actual location. Hence, for example, mobile device 235, which may be located within ground floor LCI 230, may estimate its location as being within ground floor LCI 240. Thus, based at least in part on inaccurate position estimation, a map server may transmit erroneous positioning assistance, such as a digital map of ground floor LCI 240. Upon receipt of LCI 240, a user in possession of mobile device 235 may experience difficulty trying to locate a POI or other feature that may be presented on a display device but may in fact be located a considerable distance from a mobile device's present location.

Figure 3:
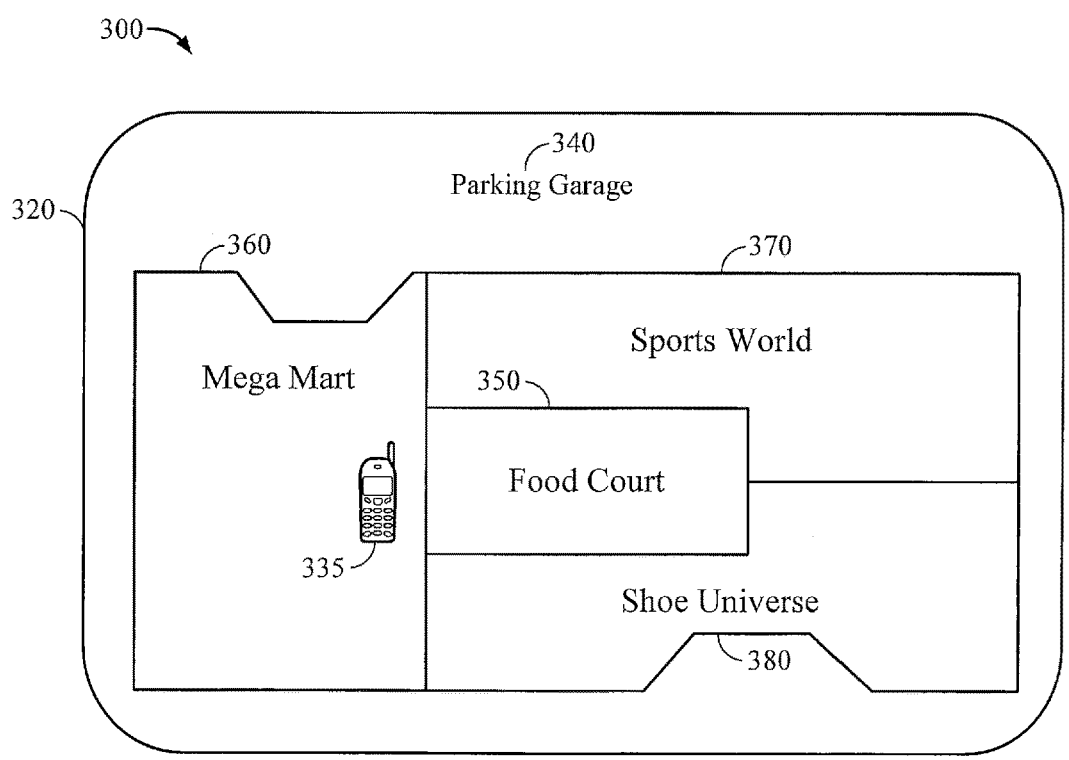

FIG. 3 is a diagram 300 of a display on an exemplary mobile device showing an image of at least a portion of an indoor environment according to an embodiment. FIG. 3 may represent, for example, a second floor layout of the shopping mall comprising ground floor LCIs 230 and 240 of FIG. 2. In FIG. 3, indications of five LCIs, comprising Parking Garage 340, Food Court 350, Mega Mart 360, Sports World 370, and Shoe Universe 380 are presented using display device 320. It should be noted that within LCIs a number of POIs, features, structures, boundaries, and so forth may be encountered. For example, parking garage 340 may comprise numerous rows of parking spaces, which may include compact POIs corresponding to handicap parking spaces, motorcycle and bicycle parking areas, bus and recreational vehicle parking areas and so forth. Similarly, Food Court 350 may comprise a variety of POIs corresponding to restaurants and other food vendors, for example.

In FIG. 3, mobile device 335, and an associated user (not shown in FIG. 3) may be positioned near an intersection of Mega Mart 360, Food Court 350, and Shoe Universe 380. Mobile device 335 may attempt to estimate its position using, for example, characteristics of signals received from one or more wireless access points, for example, such as wireless access points 270, 272, 274, and so forth, as shown in FIG. 2. As discussed previously herein, for various reasons, mobile device 335 may be unable to accurately estimate its position resulting, at least in part, from multipath signal propagation between wireless access points and the mobile device, constructive and destructive interference between direct and reflected signals, etc. Responsive to such uncertainty in position estimation, for example, a map server may not be capable of ascertaining the LCI that most closely corresponds to an estimated location of mobile device 335.

In embodiments, rather than instruct a map server to provide assistance data for all LCIs shown in FIG. 3 (e.g., parking garage 340, Food Court 350, Mega Mart 360, Shoe Universe 380, and Sports World 370) a map server may instead provide indications of candidate LCIs for selection by a user. In particular embodiments, indications of candidate LCIs may be presented in rank order from most likely or probable to least likely or probable (e.g., decreasing order of likelihood). However, in other embodiments, indications of candidate LCIs may be presented on a display device according to a different order, such as alphabetically according to the LCI name (e.g., Food Court, Mega Mart, Parking Garage, etc.,), popularity (e.g., most popular LCI to least popular LCI), or a combination thereof, and claimed subject matter is not limited in this respect.

Figure 4:
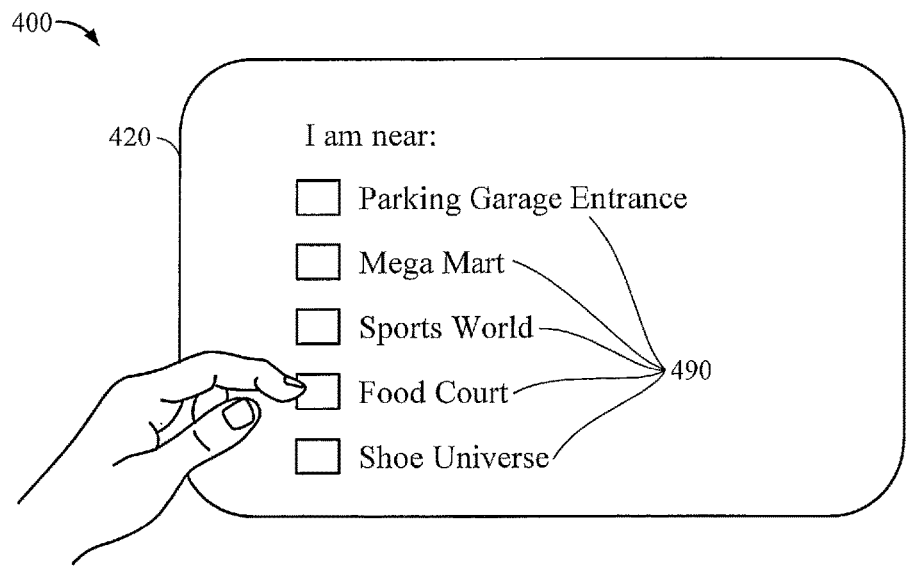
FIG. 4 is a schematic diagram of a display on an exemplary mobile device showing a list of indications of candidate LCIs for selection by a user according to an embodiment.

FIG. 4 is an illustration of a display on an exemplary mobile device 400 showing a list of indications of candidate LCIs for selection by a user according to an embodiment. As shown in FIG. 4, a mobile device user may be presented with indications 490, for example, a user's immediate surroundings. In some embodiments, candidate LCIs may be presented in decreasing order of likelihood that the LCIs include a current location of the mobile device. In other embodiments, candidate LCIs may be presented in alphabetical order, in decreasing order of proximity to the user's current estimated location (e.g., most proximate to least proximate), by decreasing order of preference (e.g., based on prior expressions of interest in a particular store or product in a particular store), by decreasing order of popularity of an LCI (e.g., from most popular to least popular), in random order, or by other means, and claimed subject matter is not limited in this respect. In some embodiments, up to five candidate LCIs may be arranged in descending order of likelihood and presented to a mobile device user. Accordingly, in FIG. 4, for example, indications of LCIs presented by way of display 420 may begin with "Parking Garage Entrance," which may reflect the most likely or probable LCI, and conclude with "Shoe Universe," which may reflect the fifth most likely or probable LCI.

In embodiments, likelihood or probability of candidate LCIs may be determined by way of, for example, measurement or detection of received signal strength of one or more access points of an LCI. For example, if a mobile device receives a particularly strong radio signal from a particular access point, a mobile device may estimate that the device is most likely located within an LCI corresponding to the access point. LCIs comprising access points, from which weaker radio signals may be received, such as a second strongest signal, third strongest signal, and so forth, may be ranked accordingly.

In other embodiments, for example, likelihood or probability of candidate LCIs may be determined by way of, for example, measurement or detection of average received signal strengths of LCI access points. For example, if a mobile device receives signals from a group of access points of an LCI, a mobile device may compute average signal strength for the group. Average signal strengths for a group of access points may be compared with average signal strengths from groups of access points of other LCIs, for example, and ranked in descending order on display 420.

In some embodiments, for example, likelihood or probability of candidate LCIs may be determined by way of, for example, popularity of one or more LCIs. For example, if a mobile device user has very recently entered a shopping mall (as discussed is the description of FIG. 2) from an external location, such as a popular parking structure, a most likely or probable LCI may correspond to an area nearest the shopping mall's parking garage. Accordingly, a display device may arrange candidate LCIs in descending order beginning with an option to select for downloading of a digital map corresponding to an area near the parking garage entrance. In FIG. 3, for example, since Mega Mart and Sports World are proximate with a parking garage entrance, indicators for Mega Mart and Sports World may be listed near the top of the list of likely or probable candidate LCIs. Continuing with the example of FIG. 2, the indicators for Food Court and the Shoe Universe may represent candidate LCIs that are less probable or likely.

In other embodiments, likelihood or probability of candidate LCIs may be determined by way of, for example, prior estimated positions of a mobile device. In one possible example, if a user has very recently entered a complex structure from an outside location, a most likely or probable LCI may correspond to an LCI that borders an outside location. In other embodiments, likelihood or probability of candidate LCIs may be determined by way of, for example, output signals from one or more sensors of a mobile device. In one instance, if an output signal of a mobile device indicates recent vertical acceleration and/or indicated a decrease in barometric pressure, for example, a mobile device may present an indication of an LCI corresponding to an upper floor of a complex structure with higher likelihood or probability than indications of an LCI corresponding to a lower floor.

It should be noted that any combination of approaches may be employed by a mobile device and/or a map server, for example, to estimate of likelihood or probability of candidate LCIs, and claimed subject matter is not limited in this respect. For example, various approaches may be simultaneously or sequentially employed to estimate likelihood or probability of candidate LCIs. Results of approaches may be assigned weighting factors and summed or aggregated to form an overall combined or composite measure of likelihood or probability. An indication of an LCI having a higher combined or composite probability may be listed near the top of display 420.

Thus, a user may easily select from a list of indications of candidate LCIs according to the LCI that refers to a portion of the complex structure within which the user is most likely located. In this manner, by way of a small amount of user interaction with a mobile device, such as merely selecting an LCI by way of a user interface to a mobile device, a user may receive position assistance that is of immediate benefit. In embodiments, selection of an LCI may be confirmed by communicating with, for example, one or more wireless access points to verify proximity of a mobile device with a wireless access point. For example, if a user has selected an indication for an LCI corresponding to Food Court 350, of FIG. 3, a mobile device may maintain contact with one or more access points within Food Court 350 to obtain updated estimates of signal round trip time delay, which may be used to improve position estimations.

In particular embodiments, a mobile device may be equipped with a sensor suite, which may enable a mobile device to confirm user selection of an LCI. For example, if a user has selected an LCI for an upper floor of a multistory structure, measurements from a vertical axis accelerometer, for example, may confirm that the device has recently undergone acceleration in an upward direction. In another embodiment, a user selection of an LCI for an upper floor may be confirmed by detecting a recent change in barometric pressure by way of monitoring changes in an output signal of a barometric pressure sensor. It should be noted that a variety of sensors of a mobile device may be utilized to confirm user selection of an LCI, and claimed subject matter is not limited in this respect.

Figure 5:
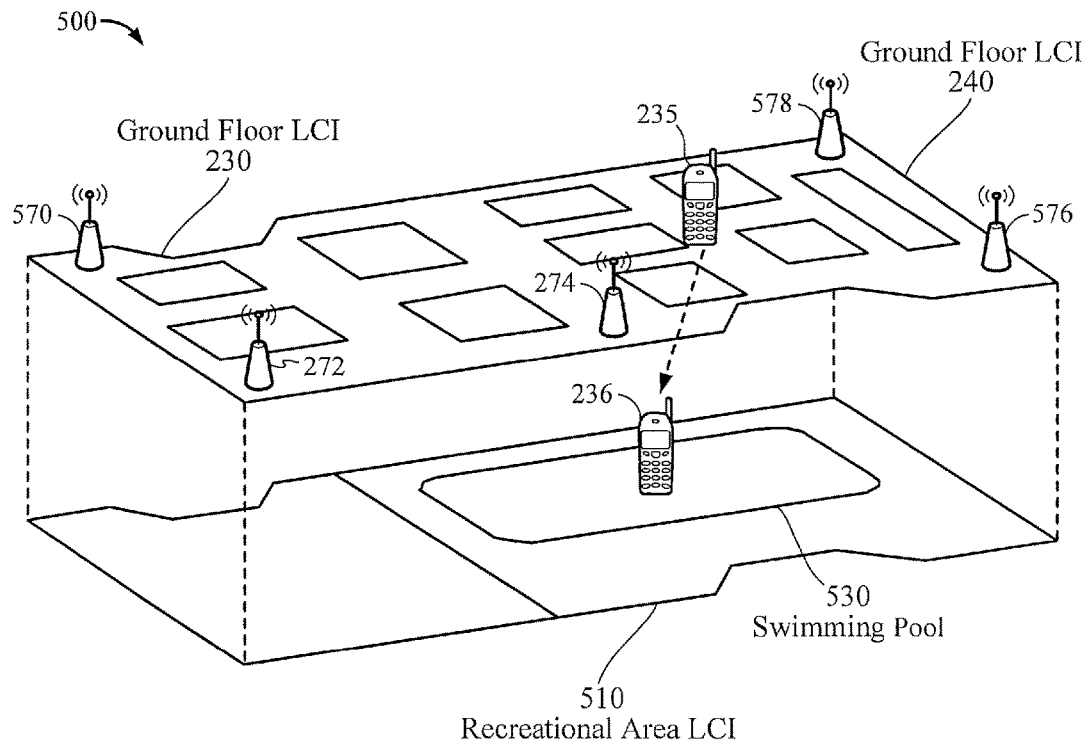
FIG. 5 is a schematic diagram of a layout of ground floor and a basement of a multistory building comprising multiple LCIs according to an embodiment.

In certain embodiments, a user selection of an LCI may be confirmed by way of evaluating a mobile device's estimated location and comparing the estimated location with "possible" locations. To illustrate the concept, FIG. 5 shows layouts 500 of ground floor (top) and a basement (bottom) of a multistory building comprising multiple LCIs according to an embodiment. The layouts of the basement and ground floors of FIG. 5 may be individually displayed by way of a display device 220 of FIG. 2, for example.

In FIG. 5, in a manner similar to the description of FIG. 2, wireless access points 570, 572, 574, 576, and 578, may be positioned at various locations shown on ground floor LCI 230 and 240. In embodiments, a user may wish to receive positioning assistance in the form of a digital map for LCI 240, for example, within which mobile device 235 may be currently located. As previously mentioned, positioning assistance may be of benefit to the user of mobile device 235 by enabling a user to locate one or more POIs within LCI 240. Also as previously mentioned, distortions in signal strength, constructive and destructive interference among reflected and line-of-sight signals received from wireless access points and other phenomenon may bring about errors in accurately estimating a current location of mobile device 240.

In response to a mobile device presenting indications of candidate LCIs to a user of mobile device 235, a user may erroneously select an LCI corresponding to recreational area 510. An erroneous selection may be brought about by a user misreading material presented on a display device, a user not being keenly aware of his or her surroundings, a user touching an incorrect portion of a touchscreen display, or by any other type of user error, and claimed subject matter is not limited in this respect.

In response to a mobile device receiving a selection of an LCI, which may correspond, for example, to recreational area 510, a mobile device may receive, by way of a wireless communications channel, for example, position assistance for the LCI corresponding to recreational area 510. A mobile device may estimate its location at 236 within recreational area 510, which may, in this instance, correspond to an impossible location, such as within the swimming pool 530, for example. Responsive to a mobile device estimating a position as corresponding to inside a swimming pool, a mobile device may reject a user's selection of an LCI and present, for example, and updated listing of candidate LCIs.

It should be noted that a mobile device may reject a user selection of an LCI for a variety of other reasons, and claimed subject matter is not limited in this respect. In one example, in response to receiving positioning assistance, such as a digital map, corresponding to a user selection of an LCI, a mobile device may estimate its location as being within a concrete wall, bulkhead, or other impenetrable structure. In another example a user located on a ground floor may erroneously select an LCI corresponding to a loft, mezzanine, balcony, or other partial structure that overlooks a ground floor. In this instance, a navigation application operating on a mobile device may determine that the mobile device cannot possibly be located in an area where a sufficient floor or other support structure does not exist.

In embodiments, responsive to a determination that a user has selected an incorrect LCI, a mobile device may override a user selection. In one example, such as that of FIG. 5, if a mobile device determines that it is not possible to operate the mobile device within a swimming pool, a mobile device may override a user selection, for example. In another example, a user may manually enter, such as by way of a keyboard, keypad, touchscreen, or other input device, an indication of an LCI being absent from a list of candidate LCIs. In another example, a mobile device may override a user selection if a user input is not received within an allotted time span, such as approximately 10.0 seconds, 15.0 seconds 30.0 seconds, 1.0 minute, and so forth.

In another example, a mobile device may override a user selection in response to determining that subsequent to receiving a user selection, a mobile device is unable to compute a position based, at least in part, on positioning assistance received in response to a mobile device receiving a user selected LCI. In embodiments, a user-selected LCI may, for example, correspond to one or more access points. Hence, responsive to receipt of a selection of an indication of a particular LCI, a mobile device may attempt to acquire a signal from one or more access points corresponding to the particular LCI. If a device cannot acquire signals from access points, a mobile device may override a user selected LCI and revert to an automatic LCI selection mode. In an automatic LCI selection mode, and LCI having the highest probability or likelihood may be selected by the mobile device.

In another instance, a mobile device may attempt to estimate a location within one or more LCIs and may select an LCI based on uncertainty in a user's estimated location within the selected LCI. Thus, for example, a mobile device may receive LCIs from one or more map servers and may compute one or more uncertainties of additional estimated positions as a mobile device user moves about within an area covered by a downloaded LCI. If uncertainties in additional estimated positions, which may be calculated as the user moves about, comprise values greater than a threshold amounts, such as approximately 5.0 m, approximately 10.0 m, and so forth, a mobile device may automatically (e.g., without user input) select an LCI having an uncertainty lower than a threshold. In other instances, a, mobile device may estimate that a position within an LCI is unlikely or impossible. For example, if a user selects an LCI corresponding to a balcony of a theater, a mobile device may determine that estimates of a user's position corresponding to locations outside of the balcony may be unlikely or even impossible. In such an instance, for example, a mobile device may automatically (e.g., without user input) select an LCI corresponding, for example, to a ground floor of the theater where such an estimated position may be possible. In another instance, if a user selects an LCI corresponding to a ground floor of a theater and appears to strictly move among locations along an edge of a second floor balcony, a mobile device may determine that the user may be, in fact, located on the balcony. In such an instance, a mobile device may automatically (e.g. without user input) select an LCI corresponding to a balcony, for example. It should be noted, however, that a mobile device may override a user selection responsive to other conditions, and claimed subject matter is not limited in this respect.

Figure 6:
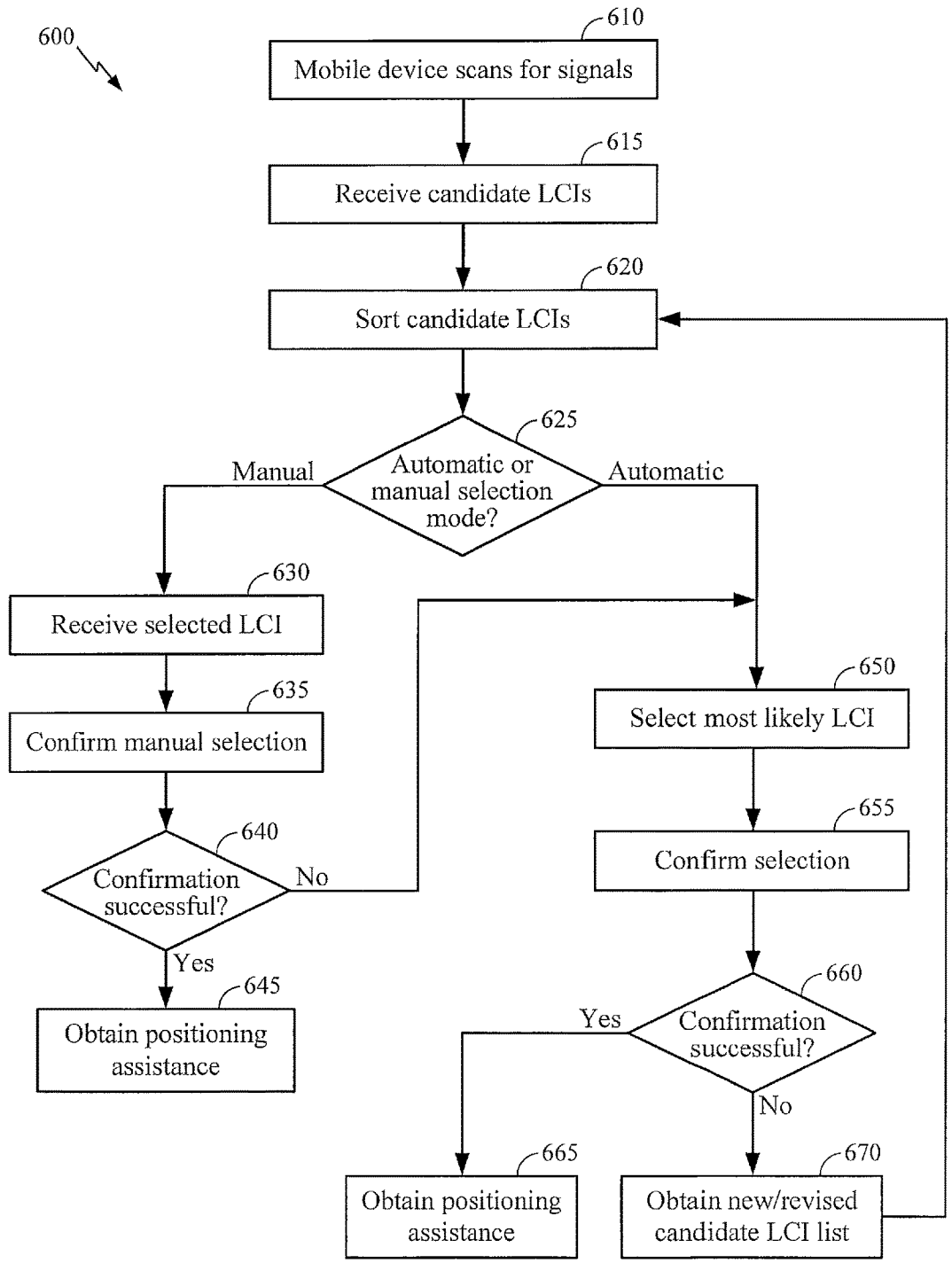
FIGS. 6-7 are flow diagrams for methods of selecting an LCI for positioning a mobile device according to an embodiment.

FIG. 6 is a flow diagram 600 of a method for selecting an LCI for positioning the mobile device according to an embodiment. Example implementations, such as those described in FIG. 6 and others herein, may include blocks in addition to those shown and described, fewer blocks, blocks occurring in an order different than may be identified, or any combination thereof. The method may begin at block 610, wherein a mobile device may scan a communications channel for signals transmitted from access points and/or other transmitters that may convey position assistance to the mobile device. Block 610 may be performed responsive to a mobile device entering a complex indoor or partially indoor structure, such as a shopping mall, or other complex multistory structure. At block 615, a mobile device may receive an ordered list of candidate LCIs from one or more access points, for example. In embodiments, identifying signals, such as MAC ID addresses may be provided along with corresponding LCIs from the ordered list. At block 620, a mobile device may sort candidate LCIs prior to presenting candidate LCIs to a user by way of a display device.

At block 625, if a mobile device has entered an "automatic" mode of operation, block 650 may be performed in which a mobile device user may select a most likely LCI. In embodiments, a most likely or probable LCI may be selected based, at least in part, on characteristics of signals received from one or more access points. Characteristics may include received signal strengths, round-trip signal delays between a mobile device and an access point, and other criteria. In embodiments, a most probable or likely LCI may be selected based, at least in part, on popularity of a first LCI relative to a second LCI, recent output of mobile device sensors such as barometric pressure sensors and accelerometers, and/or may result from one or more prior estimated positions of a mobile device. It should be noted that a variety of approaches may be used to estimate a most likely or probable LCI, and claimed subject matter is not limited in this respect.

At block 655, a mobile device may confirm a selection of an LCI by, for example, matching MAC ID addresses of access points with corresponding LCIs. In particular embodiments, in which, for example, a mobile device may be equipped with one or more barometric pressure sensors, vertical axis accelerometers, or other sensors, confirmation may comprise estimating recent changes in barometric pressure and/or vertical acceleration, which may indicate that a mobile device has increased or decreased its elevation. Such increases or decreases in elevation may indicate, for example, that a mobile device has repositioned from a ground floor to a first floor, or vice versa.

At block 660, if a confirmation has been successful, a mobile device may, at block 665, obtain positioning assistance in the form of receiving a digital map from a map server, for example. If, however, confirmation has not been successful, block 670 may be performed in which a mobile device may obtain a new/revised candidate LCI list. In embodiments, a new or revised candidate LCI list may exclude one or more previously selected LCIs if, for example, a previously selected LCI could not be confirmed by way of blocks 635 and/or 655. After performing block 670, block 620 may be repeated in which a new/revised candidate LCI list may be sorted according to criteria such as, for example, in descending order of likelihood that a mobile device is presently within an LCI. A new/revised candidate list sorted at block 620 may exclude one or more previously selected LCIs that could not be confirmed.

If the outcome of block 625 indicates that a mobile device has been placed into a manual LCI selection mode, block 630 may be performed in which a mobile device may be capable of receiving an indication of an LCI from an input keypad touch screen, or other input device. A mobile device user may select a manual mode, for example, if indications of one or more candidate LCIs are absent from a display device. At block 635, user's manual entry of an LCI may be confirmed. Confirmation may include measurement of vertical acceleration and/or changes in barometric pressure to indicate repositioning of a mobile device at a different floor of a multistory structure. If a manually selected LCI is confirmed, at block 640, block 645 may be performed in which a mobile device may obtain positioning assistance in the form of receiving a digital map from a map server, for example. If block 640 indicates that a confirmation has not been successful, block 650 may be performed in which a mobile device may enter an automatic LCI selection mode wherein a mobile device may select a most likely LCI. In embodiments, unsuccessful confirmation may arise from a user selecting an LCI not present on a list of candidate LCI, a failure of a mobile device to receive signals from one or more access points corresponding to a selected LCI, a position estimation subject to an error beyond a predetermined threshold, a user's failure to enter an LCI within a given time period (e.g., approximately 15.0 seconds, approximately 30.0 seconds, approximately 1.0 minute), or any combination thereof.

Figure 7:
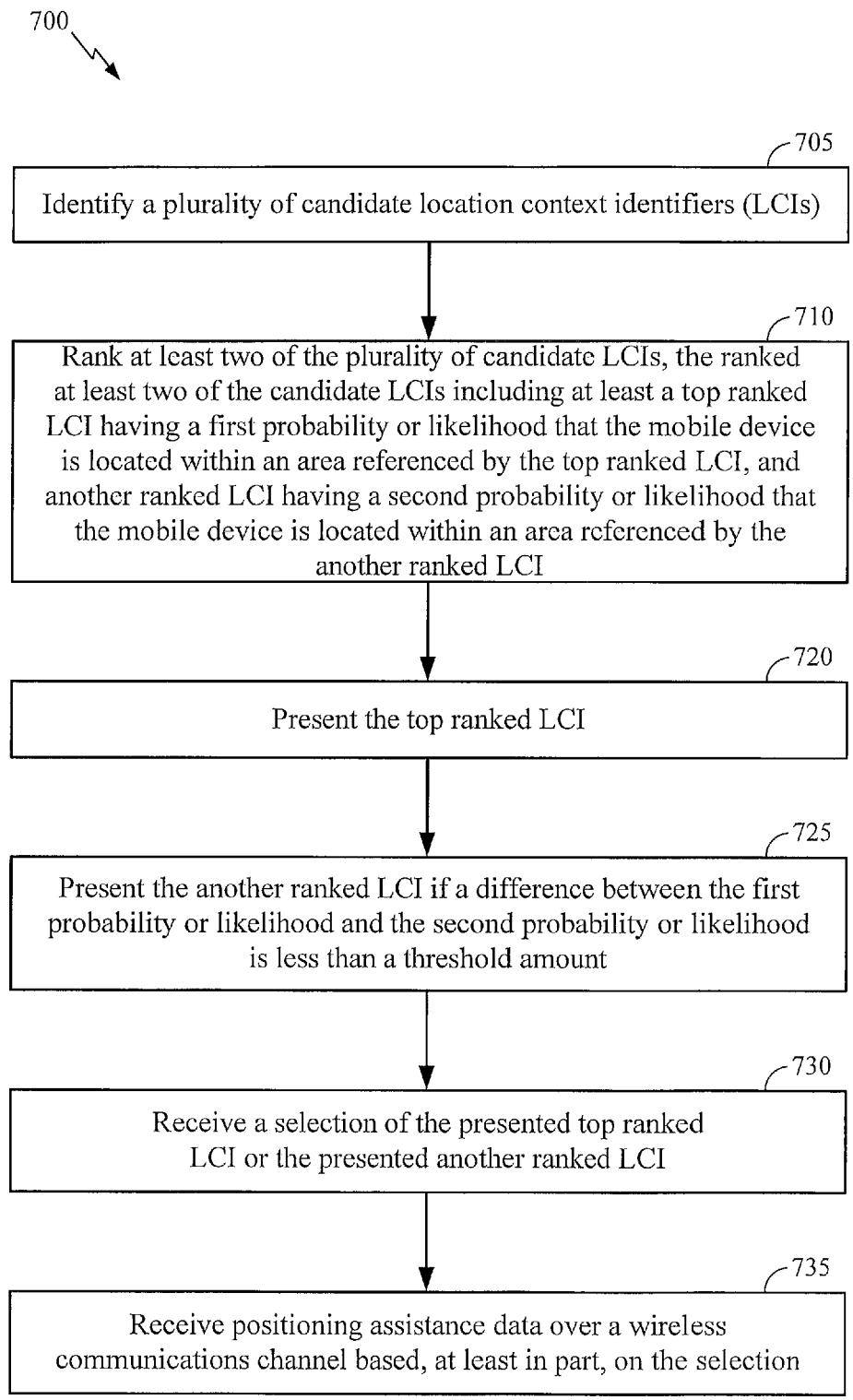

FIG. 7 is a flow diagram for a method 700 of selecting an LCI for positioning a mobile device according to an embodiment. The method of FIG. 7 may begin at block 705 in which, perhaps in response to a user entering a multistory complex structure, such as a shopping mall, airport terminal, or other complex structure, a mobile device may identify a plurality of candidate LCIs. At 710, a server, such as a map server, for example, may rank at least two of the plurality of candidate LCIs. Ranking of the at least two of the candidate LCIs may comprise assigning a top rank to an LCI having a first probability or likelihood that the mobile device is located within an area referenced by the top ranked candidate LCI. Ranking may further comprise ranking another LCI having a second probability or likelihood that the mobile device is located within an area referenced by the another (e.g., second) ranked LCI. At 720, a map server, for example, may select one or more of the plurality of candidate LCIs for presentation based, at least in part, on the ranking performed at, for example, step 710.

In particular embodiments, block 725 may be performed in which the another (e.g., second) ranked LCI may be presented responsive to a difference between the first probability or likelihood and the second probability or likelihood being less than a threshold amount. For example, a ranking technique, which may be utilized at block 710, for example, may compute probability that a user is located within LCI "A" as approximately 20.0 percent and that a user is located within LCI "B" as approximately 22.0 percent. Thus, if a predetermined ranking threshold is, for example, approximately 3.0 percent, at block 725 LCIs "A" and "B" may be selected for presentation. Thus, in embodiments, block 725 may permit a list of candidate LCIs to be presented to a mobile device user only under limited circumstances. Such limited circumstances may comprise instances, for example, in which a mobile device is unable to identify a candidate LCI that is clearly or distinctly more likely to be correct than any other ranked LCI. Block 725 may preclude presenting LCIs too often, which may represent a nuisance to a mobile device user.

At 730, mobile device may receive the selection of the presented top ranked candidate LCI or the presented another (e.g., second) ranked LCI. In embodiments, the selection may be received using, for example, a user interface of the mobile device. In embodiments, block 730 may comprise presenting a map showing at least a rough location where candidate LCIs may be located, thereby permitting a mobile device user to select a visual representation of an area. In some embodiments, selection of an LCI responsive to presentation of a visual representation of an area may represent a more intuitive approach toward soliciting and receiving a user selection, for example. The method may continue at block 735, in which a mobile device may receive positioning assistance over a wireless communications channel based, at least in part, on the selection of one of the presented one or more candidate LCIs.

Figure 8:
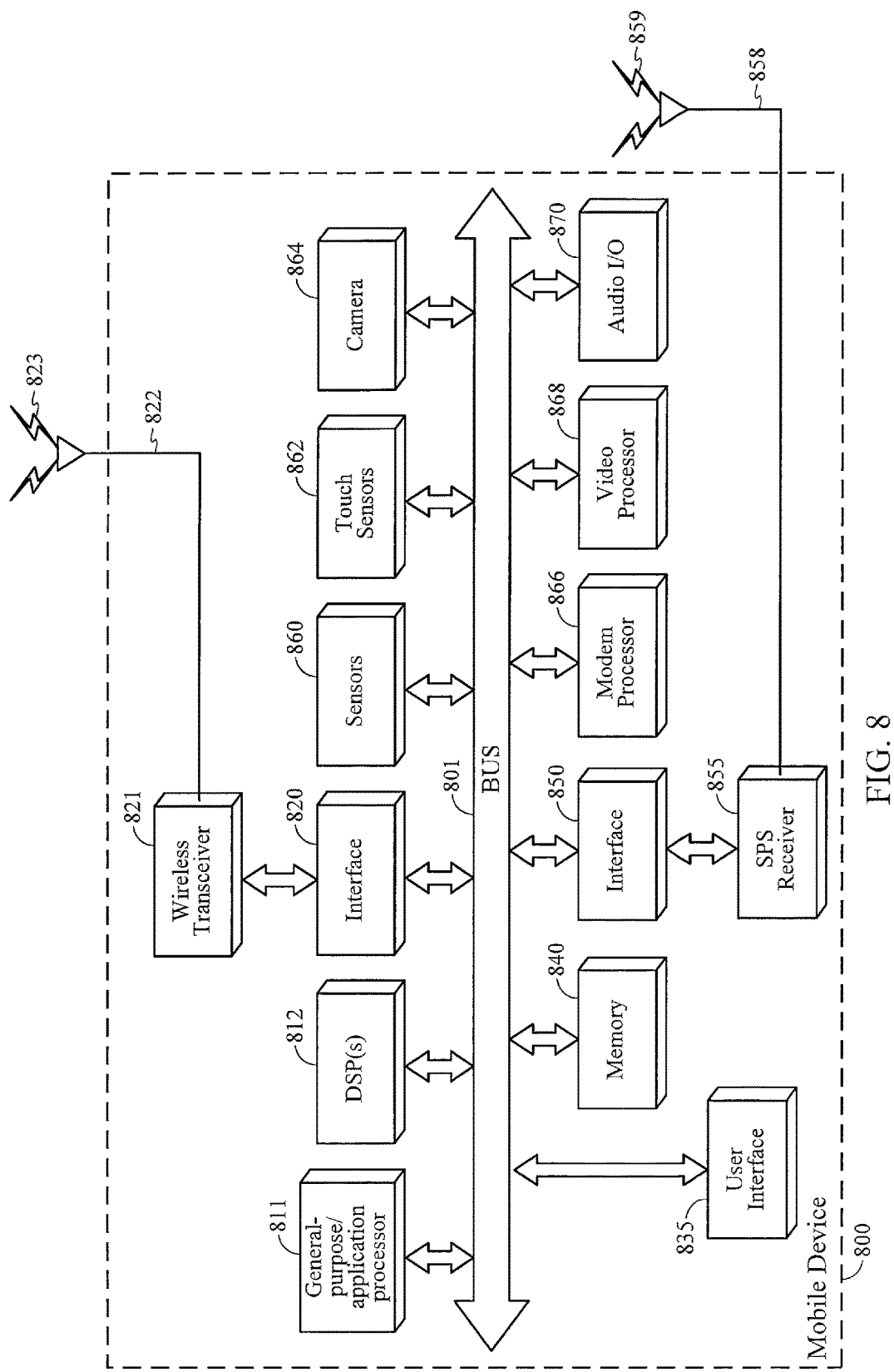
FIG. 8 is a schematic diagram of a mobile device according to an embodiment.

FIG. 8 is a schematic diagram 800 of a mobile device according to an embodiment. Mobile device 102 (FIG. 1) may comprise one or more features of mobile device 800 shown in FIG. 8. In certain embodiments, mobile device 800 may also comprise wireless transceiver 821, which is capable of transmitting and receiving wireless signals 823 via antenna 822 over a wireless communication network. Wireless transceiver 821 may be coupled to bus 801 by way of wireless transceiver bus interface 820. Wireless transceiver bus interface 820 may, in some embodiments be at least partially integrated with wireless transceiver 821. Some embodiments may include, for example, multiple wireless transceivers 821 and wireless antennas 822 to enable transmitting and/or receiving signals according to corresponding multiple wireless communication standards such as, for example, versions of IEEE Std. 802.11, CDMA, WCDMA, LTE, UMTS, GSM, AMPS, Zigbee, and Bluetooth, just to name a few examples.

Mobile device 800 may also comprise SPS receiver 855 capable of receiving and acquiring SPS signals 859 via SPS antenna 858. SPS receiver 855 may also process, in whole or in part, acquired SPS signals 859 for estimating a location of mobile device 1000. In some embodiments, general-purpose processor(s) 811, memory 840, DSP(s) 812 and/or specialized processors (not shown) may also be utilized to process acquired SPS signals, in whole or in part, and/or calculate an estimated location of mobile device 800, in conjunction with SPS receiver 855. Storage of SPS or other signals for use in performing positioning operations may be performed in memory 840 or registers (not shown).

Also shown in FIG. 8, mobile device 800 may comprise digital signal processor(s) (DSP(s)) 812 connected to the bus 801 by a bus interface, general-purpose processor(s) 811 coupled to the bus 801 by a bus interface and to memory 840. The bus interface may be integrated with the DSP(s) 812, general-purpose processor(s) 811 and memory 840. In various embodiments, functions may be performed in response execution of one or more machine-readable instructions stored in memory 840 such as on a computer-readable storage medium, such as RAM, ROM, FLASH, or disc drive, just to name a few example. The one or more instructions may be executable by general-purpose processor(s) 811, specialized processors, or DSP(s) 812. Memory 840 may comprise a non-transitory processor-readable memory and/or a computer-readable memory that stores software code (programming code, instructions, etc.) that are executable by processor(s) 811 and/or DSP(s) 812 to perform functions described herein.

Also shown in FIG. 8, a user interface 835 may comprise any one of several devices such as, for example, a speaker, microphone, display device, vibration device, keyboard, touch screen, just to name a few examples. In a particular implementation, user interface 835 may enable a user to interact with one or more applications hosted on mobile device 800. For example, devices of user interface 835 may store analog or digital signals on memory 840 to be further processed by DSP(s) 812 or general-purpose processor 811 in response to action from a user. Similarly, applications hosted on mobile device 800 may store analog or digital signals on memory 840 to present an output signal to a user. In implementations, a user may interact with user interface 835 to select an indication of one or more candidate LCIs. The query may be transmitted by way of wireless transceiver 821 to a wireless access point coupled to a map server, for example. Responsive to the query, a server, such as a map server, may respond with a list of indications of a plurality of candidate LCIs to a user of mobile device. In another implementation, mobile device 800 may optionally include a dedicated audio input/output (I/O) device 870 comprising, for example, a dedicated speaker, microphone, digital to analog circuitry, analog to digital circuitry, amplifiers, and/or gain control. It should be understood, however, that this is merely an example of how an audio I/O may be implemented in a mobile device, and that claimed subject matter is not limited in this respect. In another implementation, mobile device 800 may comprise touch sensors 862 responsive to touching or pressure on a keyboard or touch screen device.

Mobile device 800 may also comprise a dedicated camera device 864 for capturing still or moving imagery. Camera device 864 may comprise, for example an imaging sensor (e.g., charge coupled device or CMOS imager), lens, analog to digital circuitry, frame buffers, just to name a few examples. In one implementation, additional processing, conditioning, encoding or compression of signals representing captured images may be performed at general purpose/application processor 811 or DSP(s) 812. Alternatively, a dedicated video processor 868 may perform conditioning, encoding, compression, or manipulation of signals representing captured images. Additionally, video processor 868 may decode/decompress stored image data for presentation on a display device (not shown) on mobile device 800.

Mobile device 800 may also comprise sensors 860 coupled to bus 801, which may include, for example, inertial sensors and environment sensors. Inertial sensors of sensors 860 may comprise, for example accelerometers (e.g., collectively responding to acceleration of mobile device 800 in three dimensions), one or more gyroscopes or one or more magnetometers (e.g., to support one or more compass applications). Environment sensors of mobile device 800 may comprise, for example, temperature sensors, barometric pressure sensors, ambient light sensors, camera imagers, microphones, just to name few examples. Sensors 860 may generate analog or digital signals that may be stored in memory 840 and processed by general purpose application processor 811 in support of one or more applications such as, for example, applications directed to positioning or navigation operations.

In a particular implementation, mobile device 800 may comprise a dedicated modem processor 866 capable of performing baseband processing of signals received and downconverted at wireless transceiver 821 or SPS receiver 855. Similarly, modem processor 866 may perform baseband processing of signals to be upconverted for transmission by wireless transceiver 821. In alternative implementations, instead of having a dedicated modem processor, baseband processing may be performed by a general-purpose processor or DSP (e.g., general purpose/application processor 811 or DSP(s) 812). It should be understood, however, that these are merely examples of structures that may perform baseband processing, and that claimed subject matter is not limited in this respect.

In a particular implementation, mobile device 1000 may be capable of performing one or more of the actions set forth in the process of FIG. 7. For example, general-purpose application processor 811 may perform all or a portion of actions at blocks 705, 710, 720, 725, 730, and/or 735.

Figure 9:
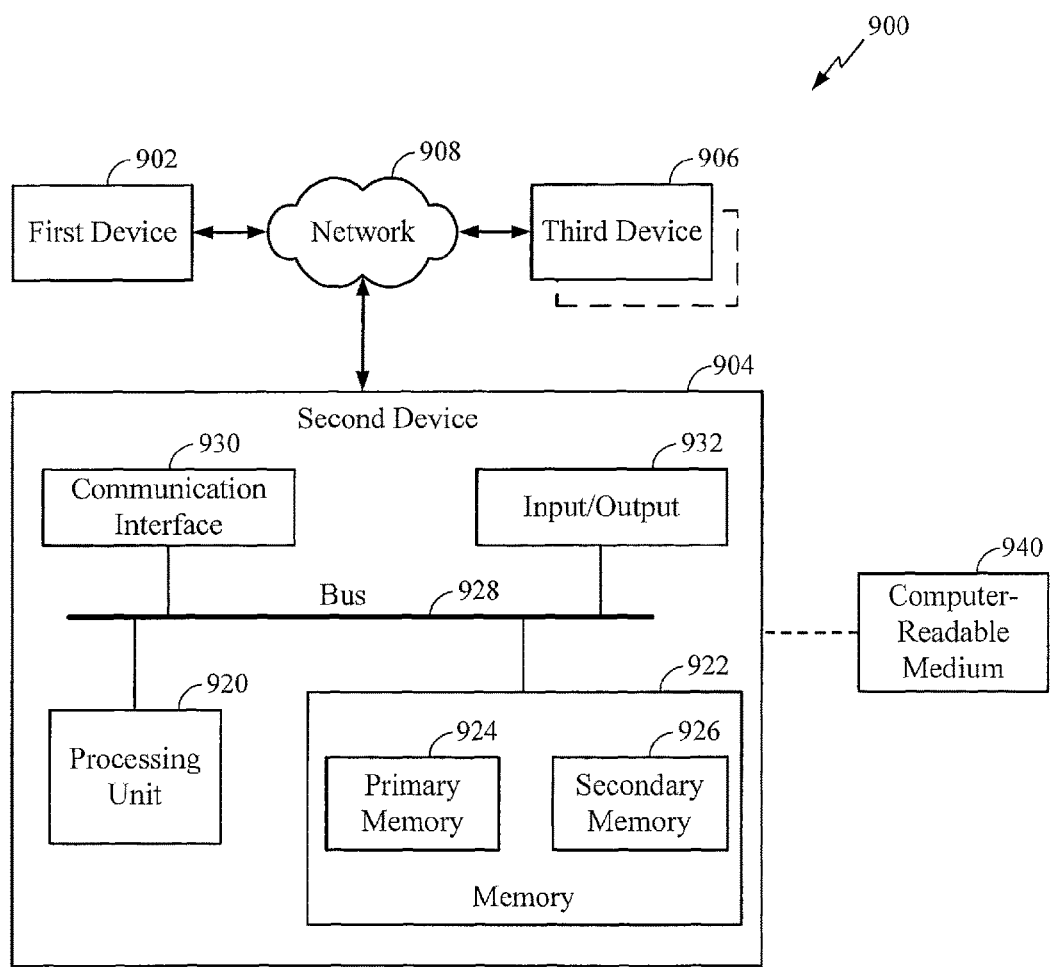
FIG. 9 is a schematic diagram illustrating an example system that may include one or more devices configurable to implement techniques for selecting an LCI for positioning the mobile device.

FIG. 9 is a schematic diagram illustrating an example system 900 that may include one or more devices configurable to implement techniques or processes described above, for example, in connection with FIG. 1. System 900 may include, for example, a first device 902, a second device 904, and a third device 906, which may be operatively coupled through a wireless communications network 908. In an aspect, first device 902 may comprise a server capable of providing positioning assistance data such as, for example, a base station almanac. Second and third devices 904 and 906 may comprise mobile devices, in an aspect. In addition, in an aspect, wireless communications network 908 may comprise one or more wireless access points, for example. However, claimed subject matter is not limited in scope in these respects.

First device 902, second device 904 and third device 906, as shown in FIG. 10, may be representative of any device, appliance or machine (e.g., such as local transceiver 115 or servers 140, 150 or 155 as shown in FIG. 1) that may be configurable to exchange data over wireless communications network 908. By way of example but not limitation, any of first device 902, second device 904, or third device 906 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first, second, and third devices 902, 904, and 906, respectively, may comprise one or more of a base station almanac server, a base station, or a mobile device in accordance with the examples described herein.

Similarly, communications network 908 (e.g., in a particular of implementation of network 130 shown in FIG. 1), may be representative of one or more communication links, processes, or resources configurable to support the exchange of data between at least two of first device 902, second device 904, and third device 906. By way of example but not limitation, communications network 908 may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 906, there may be additional like devices operatively coupled to wireless communications network 908. Thus, by way of example but not limitation, second device 904 may include at least one processing unit 920 that is operatively coupled to a memory 922 through a bus 928. It is recognized that all or part of the various devices and networks shown in system 900, and the processes and methods as further described herein, may be implemented using or otherwise including hardware, firmware, software, or any combination thereof.

Processing unit 920 is representative of one or more circuits configurable to perform at least a portion of a data computing procedure or process. By way of example but not limitation, processing unit 920 may include one or more processors, controllers, microprocessors, microcontrollers, application specific integrated circuits, digital signal processors, programmable logic devices, field programmable gate arrays, and the like, or any combination thereof.

Memory 922 is representative of any data storage mechanism. Memory 922 may include, for example, a primary memory 924 or a secondary memory 926. Primary memory 924 may include, for example, a random access memory, read only memory, etc. While illustrated in this example as being separate from processing unit 920, it should be understood that all or part of primary memory 924 may be provided within or otherwise co-located/coupled with processing unit 920.

In particular implementation, second device 904 may be capable of computing an estimated location of a mobile device. For example, second device 904 may receive parameters in messages receiving from a client STA, receiving STA and/or sending STA through communication network 908 for use in forming expressions for use in computing an estimated location of the client STA. In certain implementations, a transceiver (not shown) of a second device 904 may transmit an estimated location of second device 904 to first device 902. Responsive to receiving an estimated location, first device 902 may determine LCIs most relevant to an estimated location of second device 904 may be transmitted to the second device. Second device 904 may immediately display relevant POIs by way of a display device (not shown) coupled to, for example bus 928. In particular implementations, digital maps for an LCI may be streamed from a first device 902 to second device 904. Secondary memory 926 may include, for example, the same or similar type of memory as primary memory or one or more data storage devices or systems, such as, for example, a disk drive, an optical disc drive, a tape drive, a solid state memory drive, etc. In certain implementations, secondary memory 926 may be operatively receptive of, or otherwise configurable to couple to, a computer-readable medium 940. Computer-readable medium 940 may include, for example, any non-transitory medium that can carry or make accessible data, code or instructions for one or more of the devices in system 900. Computer-readable medium 940 may also be referred to as a storage medium.

Second device 904 may include, for example, a communication interface 930 that provides for or otherwise supports the operative coupling of second device 904 to at least wireless communications network 908. By way of example but not limitation, communication interface 930 may include a network interface device or card, a modem, a router, a switch, a transceiver, and the like.

Second device 904 may include, for example, an input/output device 932. Input/output device 932 is representative of one or more devices or features that may be configurable to accept or otherwise introduce human or machine inputs, or one or more devices or features that may be configurable to deliver or otherwise provide for human or machine outputs. By way of example but not limitation, input/output device 932 may include an operatively configured display, speaker, keyboard, mouse, trackball, touch screen, data port, etc.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Memory 922 may represent any suitable or desired information storage medium. For example, memory 922 may include a primary memory 924 and a secondary memory 926. Primary memory 924 may include, for example, a random access memory, read only memory, etc. While illustrated in this example as being separate from a processing unit, it should be appreciated that all or part of primary memory 924 may be provided within or otherwise co-located/coupled with processing unit 920. Secondary memory 926 may include, for example, the same or similar type of memory as primary memory or one or more information storage devices or systems, such as, for example, a disk drive, an optical disc drive, a tape drive, a solid state memory drive, etc. In certain implementations, secondary memory 926 may be operatively receptive of, or otherwise enabled to be coupled to, a non-transitory computer-readable medium 940.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered a self-consistent sequence of operations or similar signal processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

The terms, "and," "and" "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter.

Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method comprising, at a mobile device:
obtaining a plurality of candidate location context identifiers (LCIs);
based on uncertainty in an estimated position, ranking at least two of said plurality of candidate LCIs, said ranked at least two of said plurality of candidate LCIs comprising at least a top ranked candidate LCI;
displaying a list comprising said at least said top ranked candidate LCI and another ranked candidate LCI;
waiting, for a time period, to receive a selection of said top ranked candidate LCI or said another ranked candidate LCI via a user interface; and
upon expiration said time period, if said selection is not received, selecting the top ranked candidate LCI.

2. The method of claim 1, and further comprising:
determining said plurality of candidate LCIs based, at least in part, on signals acquired from transmitters positioned at known locations.

3. The method of claim 1, and further comprising:
obtaining an estimated position of said mobile device to confirm said selection of said top ranked candidate LCI or said another ranked candidate LCI.

4. The method of claim 3, and further comprising:
obtaining a revised plurality of candidate LCIs if said estimated position of said mobile device does not confirm said selection.

5. The method of claim 4, and further comprising:
computing one or more additional estimated positions and one or more uncertainties of said one or more additional estimated positions corresponding to areas referenced by said revised plurality of candidate LCIs; and
determining that said mobile device is within an area referenced by an LCI of said plurality of candidate LCIs based, at least in part, on said one or more uncertainties of said one or more additional estimated positions being lower than a threshold.

6. The method of claim 3, wherein said confirming comprises measuring received signal strength from one or more access points or determining that an estimated position corresponds to a possible position, or a combination thereof.

7. The method of claim 1, further comprising:
computing a first probability or likelihood and computing a second probability or likelihood, based, at least in part, on indications of received signal strength of an access point of a first LCI of said plurality of candidate LCIs relative to received signal strength of an access point of a second LCI of said plurality of candidate LCIs.

8. The method of claim 7, wherein said computed first probability or likelihood and said computed second probability or likelihood are based, at least in part, on indications of average signal strength of a plurality of access points of said first LCI of said plurality of candidate LCIs relative to average signal strength of a plurality of access points of said second LCI of said plurality of candidate LCIs.

9. The method of claim 7, wherein said computed first probability or likelihood and said computed second probability or likelihood are based, at least in part, on indications of round trip delay of a signal that travels between said mobile device and a plurality of access points of one or more of said plurality of candidate LCIs.

10. The method of claim 7, wherein said computed first probability or likelihood and said computed second probability or likelihood are based, at least in part, on popularity of said first LCI of said plurality of candidate LCIs relative to popularity of said second LCI of said plurality of candidate LCIs.

11. The method of claim 7, wherein said computed first probability or likelihood and said computed second probability or likelihood are based, at least in part, on one or more prior estimated positions of said mobile device.

12. The method of claim 7, wherein said first computed probability or likelihood and said computed second probability or likelihood are based, at least in part, on one or more output signals from at least one sensor of said mobile device.

13. The method of claim 1, and further comprising:
displaying said top ranked candidate LCI responsive to a measurement of elevation, a detection of a change in elevation, one or more vertical acceleration measurements, or any combination thereof.

14. The method of claim 13, wherein at least one of said top ranked candidate LCI or said another ranked candidate LCI corresponds to at least a portion of one or more floors of a multilevel structure.

15. The method of claim 1, wherein said plurality of candidate LCIs is displayed in decreasing order of probabilities or likelihoods that said mobile device is within an area referenced by a respective LCI of said plurality of candidate LCIs.

16. A mobile device comprising:
a display device;
a transceiver to receive and transmit wireless signals; and
one or more processors configured to:
obtain a plurality of candidate location context identifiers (LCIs) based, at least in part, on said wireless signals received by said transceiver;
based on uncertainty in an estimated position, rank at least two of said plurality of candidate LCIs, said ranked at least two of said plurality of candidate LCIs comprising at least a top ranked candidate LCI and another ranked candidate LCI;
initiate display of a list comprising said at least said top ranked candidate LCI and said another ranked candidate LCI on said display device;
initiate a timer, to determine if a selection of said top ranked candidate LCI or said another ranked candidate LCI is received within a time period; and
upon expiration of said time period, if said selection is not received, selecting the top ranked candidate LCI.

17. The mobile device of claim 16, wherein said one or more processors are additionally configured to:
determine said plurality of candidate LCIs based, at least in part, on signals acquired from wireless transmitters positioned at known locations.

18. The mobile device of claim 17, wherein said one or more processors are additionally configured to:
direct a position estimation application operating on said mobile device to confirm a user selection of said top ranked candidate LCI or said another ranked candidate LCI.

19. The mobile device of claim 18, wherein said one or more processors are additionally configured to:

initiate measurement of received signal strength from one or more access points or determine that an estimated position corresponds to a possible position, or a combination thereof.

20. The mobile device of claim 16, wherein said one or more processors are additionally configured to:
determine a first probability or likelihood and a second probability or likelihood based, at least in part, on received signal strength of an access point of an LCI, average received signal strength of a group of access points of an LCI, prior estimated positions of said mobile device, output signals of one or more sensors of said mobile device, or any combination thereof.

21. The mobile device of claim 16, wherein said one or more processors are additionally configured to:
initiate presentation, on said display device, said ranked at least two of said plurality of candidate LCIs responsive to detection of a change in elevation based on a barometric pressure, a vertical acceleration, or a combination thereof.

22. The mobile device of claim 21, wherein said one or more processors are additionally configured to:
determine that said change in elevation corresponds to a change in a floor designation of a multilevel structure.

23. The mobile device of claim 16, wherein said one or more processors are additionally configured to:
display in decreasing order of computed probabilities or likelihoods, LCIs corresponding to areas within which said mobile device is located.

24. An article comprising:
a non-transitory storage medium comprising machine-readable instructions stored thereon, which are executable by one or more processors of a mobile device, comprising:
instructions to obtain a plurality of candidate location context identifiers (LCIs);
instructions to rank, based on uncertainty in position estimation, at least two of said plurality of candidate LCIs, said ranked at least two of said plurality of candidate LCIs comprising at least a top ranked candidate LCI and another ranked candidate LCI;
instructions to display a list comprising said top ranked candidate LCI and said another ranked candidate LCI on a display device;
instructions to initiate a timer for a time period, during which to receive a selection of said top ranked candidate LCI or said another ranked candidate LCI; and
instructions to select said top ranked candidate LCI if said timer expires prior to receipt of said selection of said at least said top ranked candidate LCI or said another ranked candidate LCI via a user interface.

25. The article of claim 24, wherein said storage medium comprising said machine-readable instructions stored thereon which are executable by said one or more processors of said mobile device, further comprises:
instructions to determine said plurality of candidate LCIs based, at least in part, on signals acquired from transmitters positioned at known locations.

26. The article of claim 24, wherein said storage medium comprising said machine-readable instructions stored thereon which are executable by said one or more processors of said mobile device, further comprises:
instructions to display said ranked at least two of said plurality of candidate LCIs, in descending order of computed probabilities or likelihoods that said mobile device is within an area referenced by a respective candidate LCI of said ranked at least two of said plurality of candidate LCIs.

27. An mobile device comprising:
means for receiving and measuring wireless signals;
means for identifying a plurality of candidate location context identifiers (LCIs);
means for ranking, based on uncertainty in an estimated position, at least two of said plurality of candidate LCIs, said ranked at least two of said plurality of candidate LCIs comprising at least a top ranked candidate LCI and another ranked candidate LCI;
means for displaying said top ranked candidate LCI and said another ranked candidate LCI;
means for setting a timer for a time period, during which a selection of said top ranked candidate LCI or said another ranked candidate LCI is to be received; and
means for selecting a top ranked candidate LCI if said timer expires prior to receiving of said selection of said top ranked candidate LCI or said another ranked candidate LCI.

28. The mobile device of claim 27, wherein said means for ranking at least two of said plurality of candidate LCIs further comprises means for arranging said at least two of said plurality of candidate LCIs in descending order of computed probabilities or likelihoods that said mobile device is within an area referenced by a respective LCI of said at least two of said plurality of candidate LCIs.

29. The mobile device of claim 27, and further comprising:
means for confirming said selection of said top ranked candidate LCI or said another ranked candidate LCI.

30. The mobile device of claim 29, wherein said means for confirming said selection comprises:
means for computing a first probability or likelihood and a second probability or likelihood based, at least in part, on received signal strength of an access point of an LCI, indications of average received signal strength of a group of access points of an LCI, prior estimated positions of said mobile device, output signals of one or more sensors of said mobile device, or any combination thereof.

* * * * *